No. 766,277. PATENTED AUG. 2, 1904.
H. F. MAYNES.
BICYCLE GEARING.
APPLICATION FILED MAR. 25, 1904.
NO MODEL. 2 SHEETS—SHEET 1.
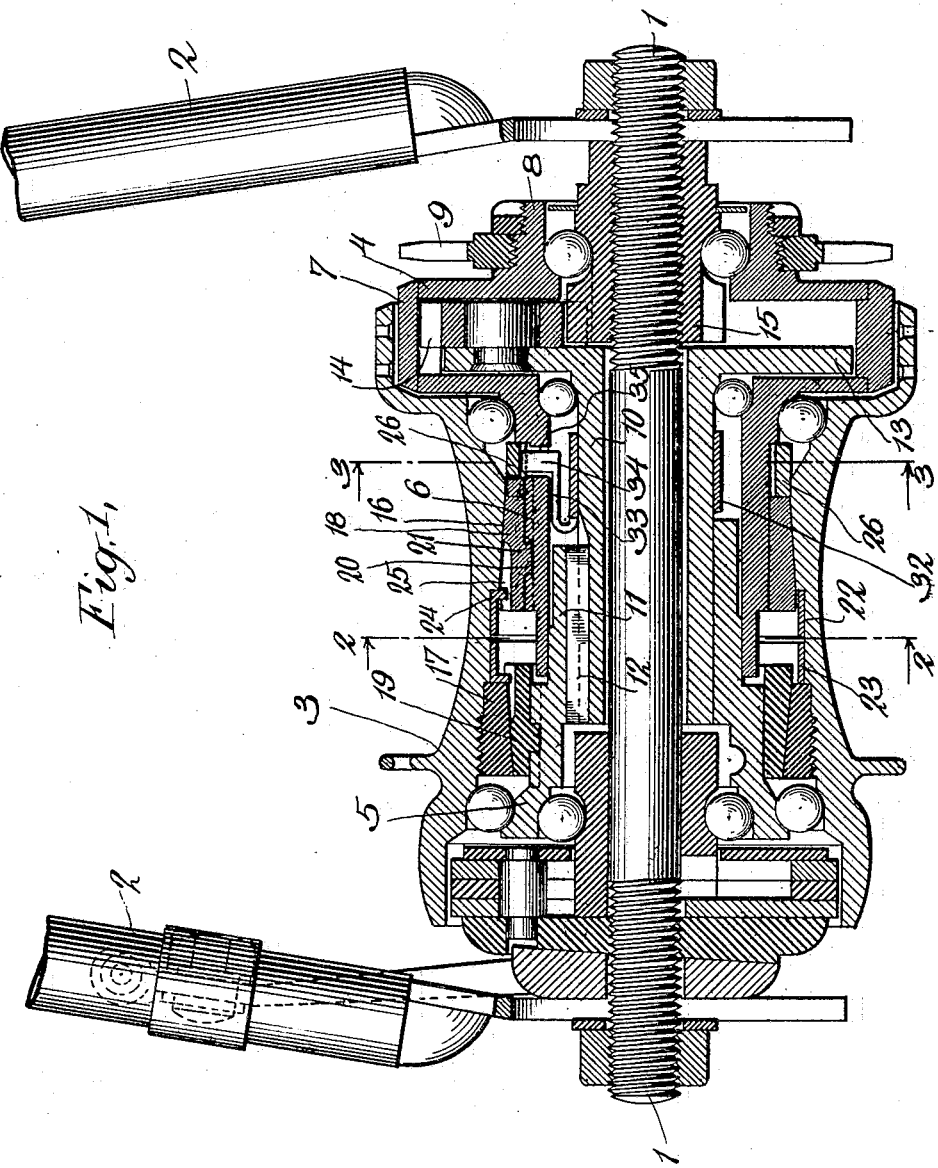
WITNESSES:
INVENTOR No. 766,277. PATENTED AUG. 2, 1904.
H. F. MAYNES.
BICYCLE GEARING.
APPLICATION FILED MAR. 25, 1904.
NO MODEL. 2 SHEETS—SHEET 2.
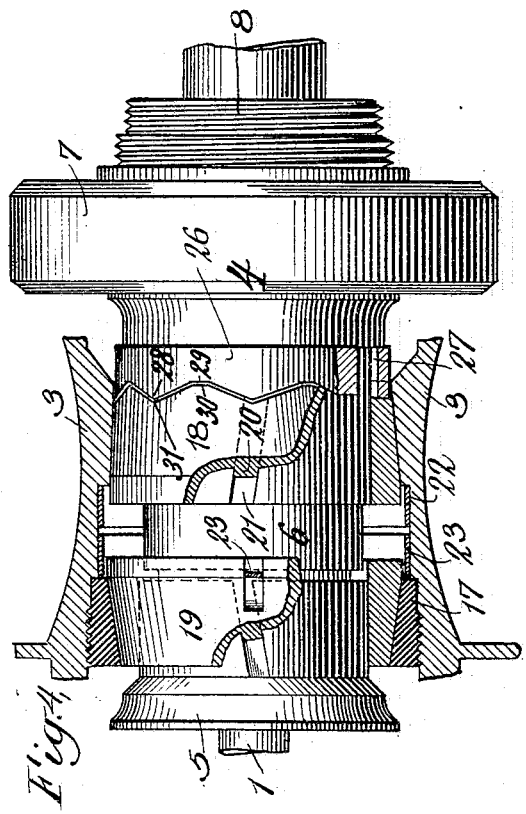
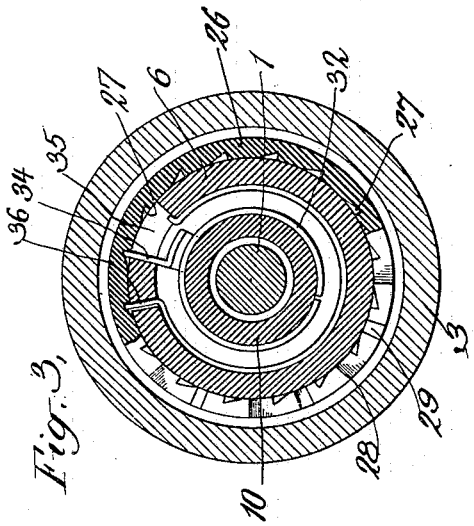
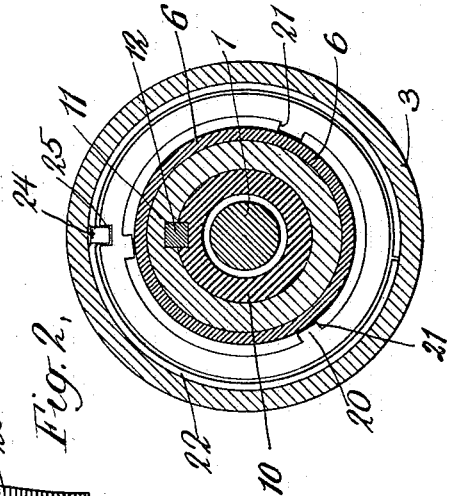
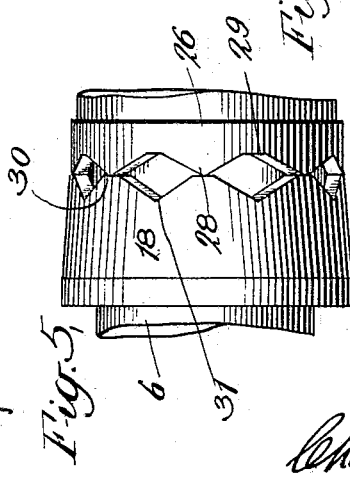
WITNESSES: INVENTOR
BY
ATTORNEYS No. 766,277.　　　　　　　　　　　　　　　　　　　　　　　　　Patented August 2, 1904.

UNITED STATES PATENT OFFICE.

HYLA F. MAYNES, OF CORNING, NEW YORK.

BICYCLE-GEARING.

SPECIFICATION forming part of Letters Patent No. 766,277, dated August 2, 1904.

Application filed March 25, 1904. Serial No. 199,926. (No model.)

*To all whom it may concern:*

Be it known that I, HYLA F. MAYNES, a citizen of the United States of America, and a resident of Corning, county of Steuben, State of New York, have invented certain new and useful Improvements in Bicycle-Gearing, of which the following is a specification, reference being had to the accompanying drawings, forming a part thereof.

My invention relates to bicycle-gearing, and particularly to change-speed mechanism operated by movements of the driving mechanism itself.

My invention consists in certain improved details of construction and combination of parts, as will hereinafter appear, and particularly to an improved clutch-controlling mechanism for operating and controlling friction-clutches.

In United States Patents No. 696,349, dated March 25, 1902, and No. 754,587, dated March 15, 1904, issued to me, I have shown means for controlling ball-clutches operating in connection with two-speed driving mechanism and controlled thereby.

The main object of my present invention is to employ friction-clutches instead of ball-clutches and to provide simple means whereby such friction-clutches may be similarly controlled by the driving mechanism.

I will now proceed to describe mechanism embodying my invention and will then point out the novel features in claims.

In the drawings, Figure 1 is a view in central vertical section of a device embodying my invention. Fig. 2 is a view in transverse section thereof, the plane of section being taken substantially upon the line 2 2 of Fig. 1. Fig. 3 is a view in similar transverse section, taken substantially upon the line 3 3 of Fig. 1. Fig. 4 is a view of the device, partially in side elevation and partially in longitudinal section, with certain parts removed and other parts broken away. Fig. 5 is a detail view in elevation of one of the clutch members employed and of the clutch-controlling ring.

In the embodiment of my invention herein shown the usual stationary axle 1 is provided, rigidly secured to the rear stays 2 of a bicycle. The rear or driving-wheel of the bicycle is represented by its hub 3, and the said hub is mounted to rotate upon suitable ball-bearings with respect to the stationary axle 1 and intermediate parts.

Interposed between the hub 3 and the stationary axle 1 are two movement-transmitting members 4 and 5, the said members mounted to rotate concentrically with respect to the hub 3 and the stationary axle. The movement-transmitting member 4 I term the "high-speed" member, and the member 5 I term the "low-speed" member. The high-speed member 4 comprises a sleeve 6, a gear-ring 7, having inwardly-projecting teeth, and a hub 8. A power-transmitting member, here shown as a sprocket-wheel 9, is rigidly secured to the hub 8 of the member 4, and the said member is provided with suitable ball-bearings, upon which it rotates, as shown. The low-speed member 5 comprises two sleeves 10 and 11, united together against relative rotation by a key 12, the said sleeve 10, provided with a portion 13, constituting a gear-carrier.

The gear-carrier 13 constitutes a support for planetary gears 14, arranged in mesh with the internal gear-ring 7 and with a stationary sun-gear 15, rigidly secured to the axle 1. The sun-gear 15, planetary gears 14, and gear-ring 7 connect the two members 4 and 5 together, so that they rotate at different relative rates of speed, the member 5 rotating at a lower rate of speed than the member 4.

The hub 3 has two conical surfaces 16 and 17 arranged interiorly thereof and designed to act as friction-surfaces for clutch purposes. Clutch-rings 18 and 19, having similar or complementary conical peripheries, are provided for engagement with the said surfaces, one of the said clutch-rings 18 being mounted on and carried by the sleeve 6 of the high-speed member 4, and the other of the said clutch-rings 19 being mounted on and carried by the sleeve 11 of the low-speed member 5. Each of the clutch-rings is provided with one or more inwardly-projecting ribs 20, arranged oblique to their axis of rotation and engaging grooves 21 in their respective sleeves, as clearly shown in Figs. 1, 2, and 4. The tongues of the respective high and low speed clutch-rings are arranged with opposite angles of inclination, the tongues of the high-speed clutch-ring 18 answering to a right-hand screw-thread of very high pitch, while the tongues of the low-speed clutch-ring 19 answer to a left-hand screw-thread of very high pitch.

When power is applied to the power-transmitting member 9 to rotate the members 4 and 5 in a forward direction, the tendency will be for both the clutch-rings 18 and 19 to be forced outwardly—that is, away from each other. If the clutch-ring 18 is allowed to engage the friction-surface 16 of the hub 3, driving connection is maintained directly from the high-speed member 4 through the clutch-ring 18 to the hub 3, and the hub will be driven at high speed. The relationship of the gearing causes the member 5 to rotate at a lower speed, and hence the friction-surface 17 rotating faster than the friction-surface of the clutch-ring 19 the clutch will be "overridden," and any tendency of the clutch-ring 19 to move outwardly by reason of its tongue-and-groove connection with the sleeve 11 will be counteracted directly its outer surface engages the friction-surface 17, whereby operative engagement of the same is prevented. If, however, the clutch-ring 18 is prevented from engaging the friction-surface 16, driving connection will be established through the low-speed clutch-ring 19, the high-speed member rotating at such time freely at a higher rate of speed than the hub.

In order to insure proper movements of the clutch-rings 18 and 19, split friction-rings 22 23 are provided, which have a light frictional engagement with the hub 3. The split rings are each provided with an inwardly-projecting tongue or tooth 24, which engage grooves 25 in their respective clutch-rings 18 and 19, so that they will be always maintained in rotative engagement therewith. The friction-rings 22 23 produce a slight drag upon the clutch-rings 18 and 19, such as will insure the proper relative movement between them and the sleeves carrying them.

From the foregoing it will be seen that in order to control the speed at which the hub 3 is to be driven it is necessary to control the high-speed clutch, for if the high-speed clutch is left free to operate the wheel will be driven at high speed and the low-speed clutch overridden, while if the high-speed clutch is prevented from operating the low-speed clutch will operate and the wheel will be driven at low speed.

In order to control the high-speed clutch, I have provided a clutch-controlling ring 26, mounted upon and carried by the sleeve 6 of the high-speed member 4, which ring is provided with inwardly-projecting ratchet-teeth 27 and with lateral projections 28 and depressions 29. (See particularly Figs. 4 and 5.) The lateral projections and depressions 28 and 29 of the said clutch-controlling ring are adapted to engage similar lateral projections 30 and 31, with which the high-speed clutch-ring 18 is provided. The sleeve 10 of the low-speed member 5 carries a split friction-ring 32, to which is secured, by means of a spring connection 33, a pawl 34. The pawl 34 passes through a slot 35 in the sleeve 6 of the high-speed member 4 and engages the ratchet-teeth 27 of the ring 26. A spring stop-pawl 36 is also provided, said pawl carried by the sleeve 6 and arranged to engage the ratchet-teeth 27 of the ring 26.

The operation of the parts is as follows: Assuming the parts to be in the positions shown in Figs. 1 and 4 of the drawings, the clutch-controlling ring 26, having its projections 28 opposite the depressions 31 of the high-speed clutch-ring 18 and the said clutch-ring therefor free to engage the friction-surface 16, the said clutch-ring will so engage the friction-surface, and hence operatively connect the high-speed driving member directly to the wheel-hub in order to drive same at high speed, as above set forth. The sleeve 6, it will be remembered, is traveling at a higher rate of speed than the sleeve 10, and the rear wall of the slot 35 in the sleeve 6 will therefore engage the pawl 34, which is in engagement with one of the teeth 27 of the clutch-controlling ring 26, and will therefore carry the clutch-controlling ring round with it at the same rate of speed at which it is traveling. The split friction-ring 32, carried by the sleeve 10, will be caused to rotate at the same rate of speed as the sleeve 6, slipping upon the sleeve 10 for such purpose. A slight back-pedaling movement will cause the high and low speed members to both move rearwardly, the sleeve 6 of the high-speed member moving somewhat faster than the sleeve 10 of the low-speed member. The pawl 34 will be held back by the frictional engagement of the split ring 32 upon the sleeve 10 until a relative movement between the sleeves 6 and 10 has taken place about equal to the length of the slot 35. This will cause the clutch-controlling ring 26 to be moved upon the sleeve 6, carrying it a distance of one of its teeth 27 and a distance sufficient to change the lateral projections 28 of the ring 26 from a position opposite the lateral depressions 31 of the clutch-ring 18 to a position opposite the lateral projections 30 of the clutch-ring. During the first back-pedaling movement the clutch-rings 18 and 19 will have been moved toward each other, owing to the tongue-and-slot connection 20 21, above described, and this movement will be somewhat quicker than the slight movement of rotation of the ring 26. If it is not quicker, the inclined surfaces between the projections and depressions of both the parts will act as cams to hasten the movement. When now a forward movement is given to the power-transmiting member, following the slight backward or back-pedaling movement above described, the movement of the sleeve 6 faster than the movement of the sleeve 10 in a forward direction will cause the pawl 34 to return to its original position at the rear end of the slot 35. During this movement the ring 26 will be held relatively stationary by reason of the stop-pawl 36, and hence the pawl 34 will be caused to move from one tooth to another and engage the next successive tooth 27. The forward movement of the power-transmitting member will tend to move the clutch-rings 18 and 19 outward again; but the clutch-ring 18 will be prevented from engaging the friction-surface 16, because its movement will be limited by the clutch-controlling ring 26. As the clutch-ring 18 is prevented from engaging its friction-surface, the clutch-ring 19, which in the previous condition was overrun, and hence caused to be inoperative, will be allowed to operate, and driving connection will be established through the low-speed clutch and the wheel will be driven at low speed. To change back to high speed, it will be only necessary to make another back-pedaling movement, which will again shift the clutch-controlling ring 26, so as to allow the high-speed clutch-ring 18 to move laterally sufficient to operatively engage the friction-surface 16. Then upon the next forward driving movement the high-speed clutch-ring will be so operated and the low-speed clutch-ring will be overrun.

It will be obvious that the foregoing is but one embodiment of my invention and that the same is capable of many and varied modifications within the spirit and scope of my invention and, further, that certain parts may be employed in connection with other parts of different construction. Hence I do not desire to be limited only to the precise details of construction and combination of parts herein.

What I claim is—

1. In bicycle-gearing, the combination with a wheel-hub, a stationary axle therefor and a power-transmitting element, of two sleeves geared together to rotate at different relative speeds, friction clutch-rings carried by said sleeves, and operated longitudinally by the rotative movement of said sleeves, and means operated by movements of the power-transmitting member for limiting lateral movement of the high-speed clutch-ring.

2. In bicycle-gearing, the combination with a wheel-hub, a stationary axle therefor and a power-transmitting element, of two sleeves geared together to rotate at different relative speeds, friction clutch-rings carried by said sleeves, and operated longitudinally by the rotative movement of said sleeves, a clutch-controlling ring carried by the high-speed sleeve, and means operated by relative movements of the power-transmitting element for operating the clutch-controlling ring.

3. In bicycle-gearing, the combination with a wheel-hub and a stationary axle therefor, of two sleeves geared together to rotate at different relative speeds, friction clutch-rings carried by said sleeves and operated longitudinally by the rotative movement of said sleeves, a clutch-controlling ring carried by the high-speed sleeve, and an operating member for the clutch-controlling ring carried by the low-speed sleeve.

4. In bicycle-gearing, the combination with a wheel-hub and a stationary axle therefor, of two sleeves geared together to rotate at different relative speeds, friction clutch-rings carried by said sleeves, and operated longitudinally by the rotative movement of said sleeves, a clutch-controlling ring carried by the high-speed sleeve and provided with ratchet-teeth, a friction-ring carried by the low-speed sleeve, and a pawl carried by the friction-ring adapted to engage the ratchet-teeth of the clutch-controlling ring.

5. In bicycle-gearing, the combination with a wheel-hub and a stationary axle therefor, of two sleeves geared together to rotate at different relative speeds, friction clutch-rings carried by said sleeves, and operated longitudinally by the rotative movement of said sleeves, the friction clutch-ring carried by the high-speed sleeve having lateral projections and depressions, a clutch-controlling ring carried by the high-speed sleeve having corresponding lateral projections and depressions, and means operated by a back-pedaling movement for shifting the position of the said clutch-controlling ring.

6. In bicycle-gearing, the combination with a wheel-hub and a stationary axle therefor, of two sleeves geared together to rotate at different relative speeds, friction clutch-rings carried by said sleeves and operated longitudinally by the rotative movement of said sleeves, and means for limiting the longitudinal movement of the clutch-ring carried by the high-speed sleeve.

7. In bicycle-gearing, the combination with a wheel-hub and a stationary axle therefor, of two sleeves geared together to rotate at different relative speeds, friction clutch-rings carried by said sleeves and operated longitudinally by the rotative movement of said sleeves, a clutch-controlling ring carried by the high-speed sleeve, and means for operating the clutch-controlling ring.

HYLA F. MAYNES.

Witnesses:
C. F. CARRINGTON,
CHARLES J. JOHNSON.